United States Patent [19]

van der Does

[11] 4,179,114

[45] Dec. 18, 1979

[54] FILM SHEET HANDLING DEVICE

[75] Inventor: Lucas van der Does, Oenkerk, Netherlands

[73] Assignee: N. V. Optische Industrie "De Oude Delft", Delft, Netherlands

[21] Appl. No.: 860,747

[22] Filed: Dec. 15, 1977

[30] Foreign Application Priority Data

Dec. 20, 1976 [NL] Netherlands .......................... 7614149

[51] Int. Cl.² ............................................... B65H 3/22
[52] U.S. Cl. ......................................... 271/19; 271/16; 271/141
[58] Field of Search ................ 271/19, 18.3, 141, 142, 271/16, 17, 24

[56] References Cited

U.S. PATENT DOCUMENTS

| 3,031,187 | 4/1962 | Sano et al. | 271/19 |
| 3,583,695 | 6/1971 | Sherwood | 271/21 |

Primary Examiner—Robert B. Reeves
Assistant Examiner—Brian M. Bond
Attorney, Agent, or Firm—Louis E. Marn

[57] ABSTRACT

A device for removing a film sheet from a stack of such sheets present in a cassette. The device comprises a pin that can be moved into engagement with the uppermost film sheet of the stack in a marginal area thereof, and thereafter is moved in a direction substantially parallel to the plane of said sheet, whereby said sheet is bulged and thus made ready for engagement by means for removing it from the stack.

6 Claims, 4 Drawing Figures

FILM SHEET HANDLING DEVICE

This invention relates to a device for removing a film sheet from a stack of such sheets present in a cassette.

In a prior device of the kind to which the invention relates, a film sheet is separated from the stack by a pushing member, which engages the leading edge of the sheet, whereby its lateral edge is bulged. A hooked member then catches under the bulged edge and pulls at least the forward part of the sheet from the cassette. A guide member is moved under the part of the sheet thus pulled upwards, whereafter rollers transport the sheet further.

The pushing member of this prior device has a blade whose edge must come into engagement with the forward edge of the sheet to bulge it. For this facility to function properly, a number of conditions must be fulfilled. First of all, the height of the blade edge has to match the thickness of the film sheet to ensure that, on the one hand, the sheet is actually bulged and does not "miss" the blade, and on the other hand, no two sheets are bulged at the same time. Accordingly it must be possible for the edge of the blade to be highly accurately positioned, so that its height exactly matches the thickness of a film sheet. Secondly, the stack of sheets must be in contact with the pushing member under a substantially constant pressure even as the stack becomes thinner. This requires the provision of spring means between the cassette bottom and the stack of sheets, which in addition has to satisfy specific requirements as regards spring characteristics. Thirdly, the edges of the film sheets to be engaged by the pushing member must be in proper vertical alignment. In this connection there may be a further problem that may cause malfunctioning. For if the uppermost sheet has a burred edge, this may cause it to become interengaged with the next lower sheet in the stack, which, owing to the pressure between the pushing member and the film sheets, may be the cause of two sheets becoming bulged at the same time, in spite of proper selection and adjustment of the blade height. A further drawback of the prior construction is that a pushing member with guide means must be mounted in the device before it can be put into operation, or else each cassette must be individually equipped with a built-in pushing member.

It is an object of the present invention to eliminate the drawbacks outlined above, and also to provide a film sheet removing device that is of simpler and less expensive construction.

According to the present invention, there is provided a device for removing a film sheet from a stack of such sheets present in a cassette, said device comprising a film sheet bulging member for bulging the film sheet relatively to the stack or the cassette bottom, a guide member arranged to be moved under a film sheet when said film sheet is at least partially separated from the stack, a roller movable in synchronism with said guide member and arranged to co-operate with a stationary, driven roller for further removal of the film sheet via the guide member, characterized in that said film sheet bulging member is a pin carried by a bell crank lever, said lever being controlled by a first camming track and being pivoted to a pivoting member pivoted to a frame member and controlled by a second camming track, the arrangement being such that the pin can press on the surface of the film sheet in a marginal area thereof.

The pin engaging with a film sheet has a double function, i.e., both bulging the sheet and bringing it into proper position for the sheet to be engaged by the guide member with transporting rollers, which, compared with the prior art, results in a simpler construction that is, therefore, less vulnerable to malfunctioning. Furthermore, the use of the pin eliminates the drawbacks connected with the pushing member used in the prior art, in particular that concomitant with overlapping burrs. In fact, when the pin presses on a film sheet the edge, which may be burred, is not pressed down, as in the prior art, but owing to the resiliency of the sheet, it will spring up from the point where the pin contacts the sheet. A further advantage of the device according to the invention is that spring means between the cassette bottom and the film stack and a pushing member with guide means in the cassette may be omitted.

According to a preferred feature of the present invention, the pivoting member comprises at least one arm pivoting about an axis extending transversely to the direction of transport of the film sheets, said arm having a portion bent over substantially at right angles to said arm, on which portion the bell crank lever is mounted. By virtue of this construction the pin can be moved to and from a stack of film sheets in a cassette in an effective manner.

Another preferred feature of the present invention is that the lever pivots about an axis extending at right angles to the bent-over portion of the pivoting member and at the end remote from the pin is bent over substantially at right angles to itself. With this construction, the axes of the two cam rollers operating the lever and the pivoting member are parallel to each other, which considerably facilitates their control by the corresponding camming tracks.

According to yet another preferred feature of the present invention, the guide member is mounted on a frame member for pivoting movement about an axis substantially parallel to the direction of movement of the pin, there being provided a third camming track, which controls the movement of the guide member. In this embodiment, the axes of the three cam rollers are all parallel to each other, and still greater ease of operation is achieved. An optimum control of the various parts is implemented in the most preferred embodiment, in which the three camming tracks and the driven discharge roller are mounted on one driven shaft.

According to a further, highly advantageous embodiment of the present invention, the bent-over part of the pivoting member makes an acute angle, preferably ranging from about 15° to about 45°, with the vertical, and the lever is connected to the pivoting member with ample shaft clearance. By virtue of these features, the pin will contact and press slightly into the material of the film sheet at an acute angle. Owing to the clearance with which the pin lever is mounted, the pressure excercised by the pivoting member will cause the pin to move a small distance away from the forward edge of the sheet, thereby slightly bulging the sheet so that the longitudinal direction of the bulge is subtantially parallel to the forward edge of the sheet. This arrangement provides an additional safeguard against the risk of two film sheets being simultaneously bulged and discharged, and also clears the forward edge of the sheet from the delivery edge of the cassette.

One embodiment of the invention will now be described, by way of example, with reference to the accompanying drawings. In said drawings, FIG. 1 shows an end view of a sheet removing device according to the present invention, taken at the delivery end thereof;

Figure 1:
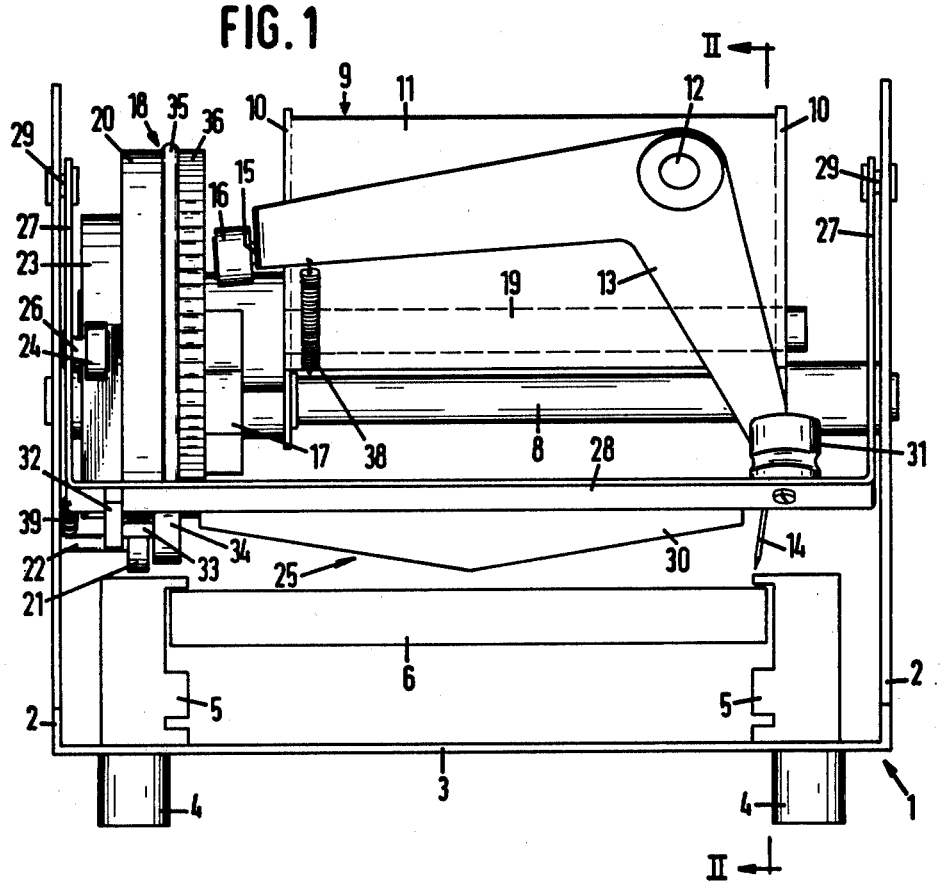

Referring to the drawings, there is shown a film sheet removing device according to the present invention. As shown, the device comprises a frame 1 with sidewalls 2 and a bottom 3 having feet 4 at its underside. Mounted on the top of bottom 3 are a pair of guiding supports 5 for receiving a cassette 6, containing a stack of film sheets 7.

Journalled in sidewalls 2 is a shaft 8 mounting a substantially U-shaped pivoting member 9, comprising two arms 10 and a body portion 11, which encloses an acute angle with the vertical. Secured to body portion 11 is a shaft 12, extending at right angles to the plane of the body portion, and mounting, with ample clearance, a bell crank lever 13. A pin 14 is secured to one end of lever 13, and the end away from the pin is bent over through approximately 90° and carries a shaft 15 mounting a cam roller 16.

Cam roller 16 runs on a camming track 17 provided on a rotary body 18 that is secured to a shaft 19 journalled in the arms 10 of pivoting member 9. The movement of member 9 is controlled through co-operation between a second camming track 20 provided on body 18, and a cam roller 21 mounted on a shaft 22, secured to sidewall 2.

A third camming track 23 is provided on body 18 for the control, through a cam roller 24, of the movement of a film sheet guiding member 25. Cam roller 24 is mounted on a shaft 26 secured to an arm 27 of member 25. Arm 27 together with a second arm 27 and a body member 28 form the basic element of sheet guiding member 25. The free ends of arms 27 are each pivoted through a shaft 29 to sidewalls 2. Secured to body member 28 is a guide plate 30, the forward edge of which points in the shape of a V in the direction of the stack of film sheets 7 in cassette 6. Body member 28 further carries a guide roller 31 and, via a support 32 and a shaft 33, a discharge roller 34.

Discharge roller 34 is mounted for free rotation about shaft 33, and is arranged to co-operate with a second, driven discharge roller, formed by a rubber band 35 applied around rotary body 18.

Rotary body 18, and hence the entire device, is driven through cooperation of a toothed wheel 36, forming part of body 18, with a gear 37 driven from a motor not shown.

In order to ensure proper contact between cam roller 16 and camming track 17, use is made of a spring 38 secured at one end to lever 13, in the vicinity of the bent-over free end thereof, and at its other end to the lower edge of body portion 11 of pivoting member 9. Proper contact between cam roller 24 and camming track 23 is ensured by a spring 39, secured at one end to film sheet guiding member 25, adjacent the transition between arm 27 and body portion 28, and at its other end to sidewall 2. No particular provisions are required for ensuring the desired co-operation between cam roller 21 and camming track 20. For roller 21 is secured to sidewall 2 at a position virtually vertically under shaft 19. The weight of the combination of pivoting member 9, lever 13 and body 18 is sufficient to ensure the desired co-action.

The operation of the film sheet removing device described is as follows.

Figure 2:
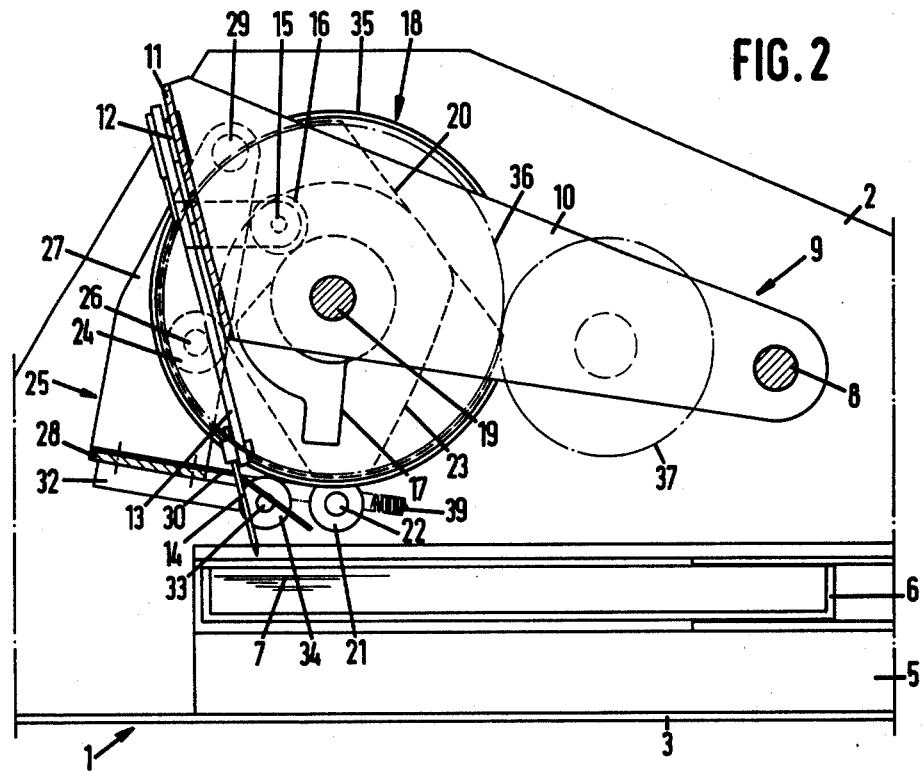
FIG. 2 is a cross-sectional view, taken on the line II—II of FIG. 1, and showing the sheet removing device in its starting position.

In the starting position, the positions of the various parts are as shown in FIG. 2. After the introduction of a cassette 6, holding a stack of film sheets 7, into guide supports 5, the driving motor is switched on, which causes gears 36 and 37, and hence body 18, to rotate in the direction of the arrows shown. At the moment the motor is switched on, cam roller 21 contacts the circular part of camming tracks 20, owing to which pivoting member 9 is in its uppermost position. Owing to the action of spring 38, roller 16 runs over the circular part of camming track 17, so that pin 14 is in the position shown in FIG. 1, above, and laterally off-set from, the uppermost film sheet on the right-hand side thereof. Cam roller 24, which is loaded by spring 39, is just on the circular part of track 23 yet, so that film sheet guiding member 25 is in the extreme right-hand position as viewed in FIGS. 2–4.

Figure 3:
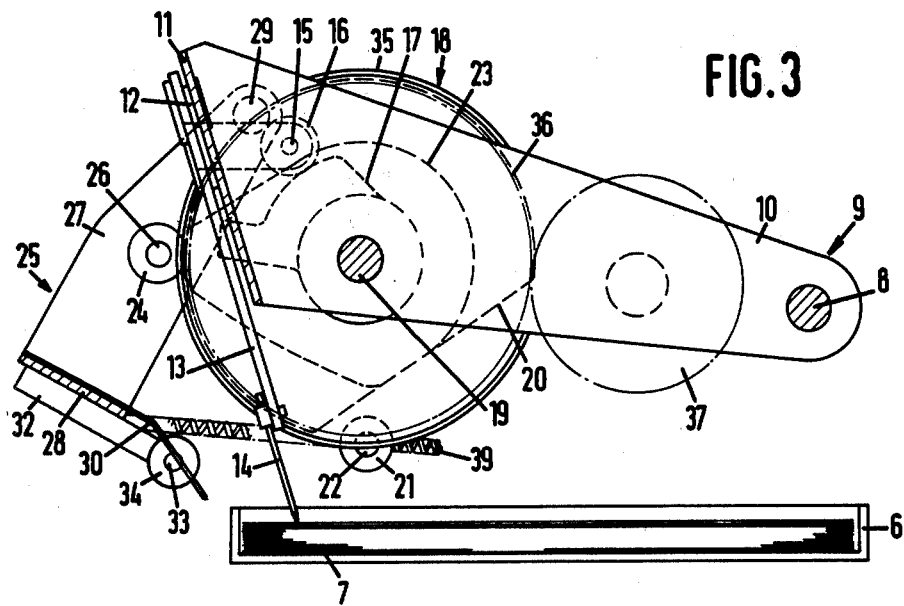
FIG. 3 is a view similar to FIG. 2, and showing the device in a position just before bulging a film sheet.

Upon further rotation of body 18, the position shown in FIG. 3 is reached. This is a result of the fact that, subsequent to its circuit part, camming track 20 is formed so that pivoting member 9 pivots downwards about shaft 8. During this movement camming track 17 causes lever 13 to pivot so that pin 14 moves to the left from the position shown in FIG. 1. The downward movement of member 9 is limited through pin 14 coming into contact with the uppermost film sheet 7 in cassette 6. As a consequence, the contact between track 20 and roller 21 is broken. Owing to the further rotation of body 18 and, hence, the breaking of the contact between roller 21 and camming track 20, the weight of member 9 and the parts attached to it comes to rest on pin 14. Owing to the pin's inclined position relative to the vertical and the clearance in the connection between lever 13 and shaft 12, the weight resting on pin 14 will cause the pin to move a short distance to the right, as viewed in FIG. 3, which distance is determined by the amount of clearance with which lever 13 is mounted, and thereby slightly bulge the uppermost film sheet, or at least effect initial separation. In this position cam roller 24 is controlled by camming track 23 so that sheet guiding member 25 is in its extreme left-hand position (see FIG. 3).

Figure 4:
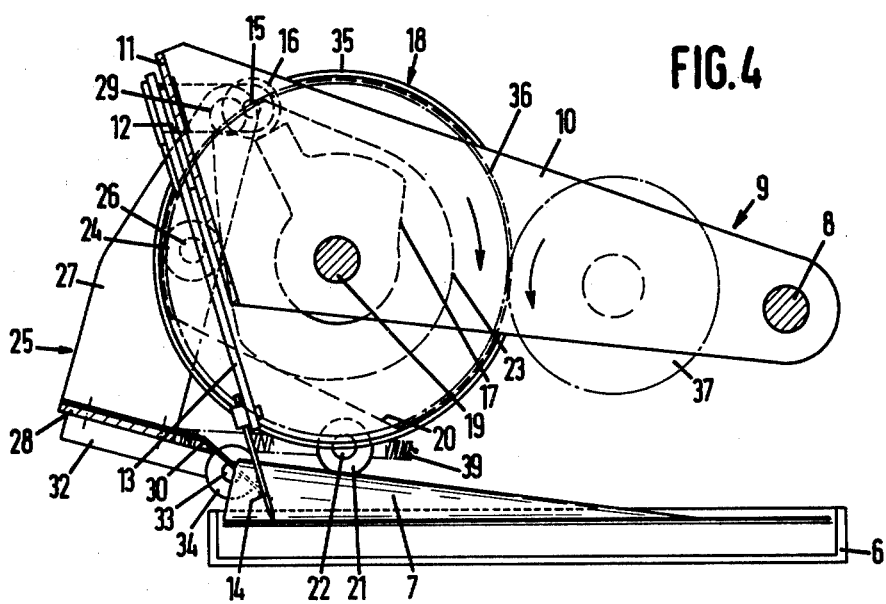
FIG. 4 is a view similar to FIG. 2, and showing the device in a position after bulging a film sheet, but before discharging the latter.

Further rotation of body 18 will first of all result in pin 14 moving further to the left (as viewed in FIG. 1) under the control of camming track 17, and thereby bulge the uppermost film sheet, which position is illustrated in FIG. 4. After the bulging of the sheet, sheet guiding member 25, under the control of camming track 23, will pivot so that at least its leading portion will move under the bulged film sheet, as also shown in FIG. 4. Starting from this position, as the body 18 rotates further camming track 20 will re-contact cam roller 21, so that pivoting member 9 will pivot upwards. Virtually at the same time pin 14 will be retracted into its starting position shown in FIGS. 1 and 2. Sheet guiding member 25 will move further under the film sheet until roller 34, via the film sheet, will come into contact with rubber band 35, whereby the film sheet will be withdrawn from cassette 6, and discharged under the guidance of these rollers and guide roller 31. After completion of this step, the device is again in the position shown in FIG. 2 and thus ready for a next cycle.

It is noted that the bulging of the film sheet as a result of the clearance between shaft 12 and lever 13 has an additional effect, i.e. clearing the leading edge of the film sheet from the forward edge of the cassette. The advantage of this feature is particularly manifest if the edge of the cassette is covered with a layer of textile material, such as velvet, in order to achieve better sealing from penetrating light.

It will be clear that the exemplary embodiment described and shown in the accompanying drawings admits of many variations and modifications, which will readily occur to those skilled in the art without departing from the scope of the present invention. Thus, for example, rotary body 18 can be split into two parts, mounted on shaft 19 on opposite sides of member 9, in which case there may be two rollers 34 and two rubber bands 35.

I claim:

1. A device for removing a film sheet from a stack of such film sheets present in a cassette, said device comprising:
    a frame;
    means on said frame for holding said cassette containing said stack of said film sheets;
    a pivoting member pivotally mounted to said frame, said pivoting member comprised of at least one arm pivoting about an axis extending transversely to the direction of transport of said film sheets, said arm having a portion bent-over substantially at right angles to said arm;
    a bell crank lever pivotally mounted to said bent portion of said arm of said pivoting member;
    a pin fixedly carried by said bell crank lever;
    first camming means for controlling the movement of said pivoting member and operable to pivot said pivoting member and the lever attached to the latter, so that said pin is moved into engagement with the uppermost film sheet of said stack in a marginal area thereof;
    second camming means for controlling the movement of said bell crank lever, and operable to pivot said bell crank lever so that said pin, whilst in engagement with the uppermost film sheet of said stack, is moved in a direction substantially parallel to the plane of said sheet, thereby causing said sheet to become bulged;
    a film sheet guiding member connected to said frame;
    means for moving said film sheet guiding member under the uppermost film sheet of said stack when said film sheet is at least partially separated from said stack; and
    means for further removal of said film sheet via said film sheet guiding member.

2. The device as defined in claim 1, wherein said bell crank lever pivots about an axis extending at right angles to said bent-over portion of said arm of said pivoting member, and wherein an end remote from said pin is bent over substantially at right angles to itself.

3. The device as defined in claim 1 and further comprising a frame member mounting said film sheet guiding member for pivotal movement about an axis substantially parallel to the direction of movement of said pin, and third camming means for controlling the movement of said film sheet guiding member.

4. The device as defined in claim 3 wherein said camming means each comprise a cam defining a camming track and mounted on a driven shaft.

5. The device as defined in claim 1 wherein said bent-over portion of said arm pivoting member encloses an acute angle with the vertical, and wherein said lever is connected to said pivoting member with ample shaft clearance, so that, as said pin comes into engagement with said uppermost film sheet, the angular position of said pin is slightly changed and its point, whilst in engagement with said film sheet, moves slightly away from the forward edge of said stack of film sheets to disengage thereby said uppermost film sheet from the next lower sheet in said stack.

6. The device as defined in claim 5 wherein said acute angle is in the range of from approximately 15° to approximately 45°.

* * * * *